United States Patent Office 3,462,483
Patented Aug. 19, 1969

3,462,483
NOVEL DERIVATIVES OF 3-HYDROXY-4-PHENYL-BUTYRIC ACID
Vladimir Petrow, Oliver Stephenson, and Anthony Musgrave Wild, London, England, assignors to The British Drug Houses Limited
No Drawing. Filed July 2, 1965, Ser. No. 469,311
Claims priority, application Great Britain, July 23, 1964, 29,654/64
Int. Cl. C07c 63/44, 69/76, 103/20
U.S. Cl. 260—520          14 Claims

ABSTRACT OF THE DISCLOSURE

A group of novel derivatives of 3-hydroxy-4-phenyl-butyric acid having anti-inflammatory properties are provided by this invention. The novel derivatives are substituted in the phenyl group and the substituted acids may be converted to esters, amides and salts which also possess anti-inflammatory properties. The compounds are produced by reacting a selected aryl Grignard reagent or aryl lithium reagent, wherein the aryl group includes the desired substituent, with a 2,3-epoxypropyl halide to give the corresponding 3-aryl-2-hydroxy propyl halide, reacting this compound with an alkali metal cyanide to provide the corresponding nitrile, and reacting the nitrile with the appropriate reagent to provide the selected 4-aryl-3-hydroxy butyric acid, ester or amide. The known acid can also be produced by this new process.

---

We have made the unexpected discovery that certain 4-aryl-3-hydroxybutyric acids possess anti-inflammatory properties. Thus, for example, 4-(4'-biphenylyl)-3-hydroxybutyric acid was active in the rat-paw carrageenin assay and in the standard guinea pig U.V. erythema assay. In the erythema assay, on oral administration it was shown to possess an anti-inflammatory activity approximately 6 times greater than phenylbutazone used as standard. It had an $ED_{50}$ of 0.5 mg./kg. and an $LD_{50}$ of greater than 1,600 mg./kg. (in mice) and is consequently a highly active anti-inflammatory agent.

It is an object of this invention to provide new 4-aryl-3-hydroxybutyric acids and esters thereof having the general Formula I below (where X, R and $R^1$ are as hereinunder defined but when X is OH, R and $R^1$ cannot both be H) together with functional derivatives thereof including their pharmaceutically acceptable salts and amides.

It is another object of the present invention to provide a process for the preparation of 4-aryl-3-hydroxybutyric acids, esters and amides of general Formula I below. It will be obvious to those skilled in the art that the compounds of the present invention can exist in optically active forms. The invention covers the optically active forms as well as racemic mixtures.

It is yet another object of this invention to provide pharmaceutical and veterinary compositions of the anti-inflammatory products of the present invention comprising a 4-aryl-3-hydroxybutyric acid, ester or amide having the general Formula I below in admixture with one or more solid or liquid pharmaceutically acceptable inert carriers.

According to the present invention there is provided a process for the preparation of a 4-aryl-3-hydroxybutyric acid or an ester or amide thereof having the general formula

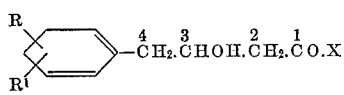

(I)

where X is hydroxy or a lower alkoxy group containing up to 6 carbon atoms or an amino group and R is hydrogen, halogen, trifluoromethyl, alkyl containing up to 8 carbon atoms or a cycloalkyl or cycloalkenyl group containing up to 7 carbon atoms; aryl or substituted aryl containing a halogen, methyl, ethyl, methoxy or ethoxy substituent; aralkyl (such as benzyl or phenethyl optionally substituted by halogen, methyl, ethyl, methoxy or ethoxy groups); alkoxy containing up to 8 carbon atoms or cycloalkoxy containing up to 7 carbon atoms; aryloxy or substituted aryloxy carrying a halogen, methyl, ethyl, propyl, butyl, isobutyl, methoxy, ethoxy, propoxy or butoxy substituent in the aryl nucleus and $R^1$ is any of the groups described above for the substituent R and may be the same or different from R or additionally R and $R^1$ may together form a cyclic substituent and represent a methylenedioxy, cyclopenta or cyclohexa group, or alternatively the group

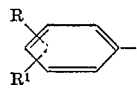

may represent an α-naphthyl or a β-naphthyl radical, which process comprises converting a halogeno-derivative of general formula

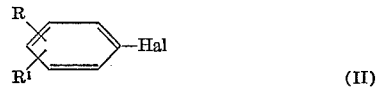
(II)

(where R and $R^1$ are as hereinabove defined) into an organo-metallic derivative having the general formula

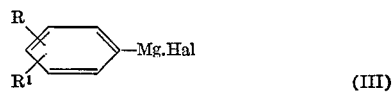
(III)

or

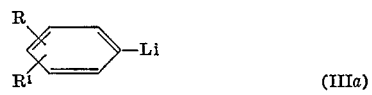
(IIIa)

(where R and $R^1$ are as hereinabove defined) condensing the resulting organo-metallic derivative with a 2,3-epoxypropyl halide

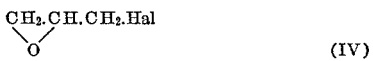
(IV)

to yield the corresponding 3-aryl-2-hydroxypropyl halide

(V)

(where R and $R^1$ are as hereinabove defined), converting the propyl halide (V) into the corresponding nitrile

(VI)

(where R and $R^1$ having the meaning hereinabove defined) by treatment with an alkali metal cyanide in a solvent, followed by conversion as required into the desired ester, acid or amide (I). This conversion may be carried out under acid or alkaline conditions using standard methods of preparation.

The organo-metallic derivative may be a Grignard derivative (III) or a lithium aryl (IIIa). The 2,3-epoxypropyl halide is preferably the 2,3-epoxypropyl chloride.

Conversion of the propyl halide into the correponding nitrile is preferably effected by treatment with potassium cyanide in an aqueous or anhydrous lower alkanol (preferably methanol or ethanol). The nitrile may be heated in solution of the appropriate alkanol containing one mole equivalent of water in the presence of an acidic catalyst preferably hydrogen chloride to form the appropriate ester (I) where X is a lower alkoxy group containing up to 6 carbon atoms. The ester may then be converted into the corresponding acid (I, where X is OH) by warming with a slight excess of aqueous alkaline hydroxide solution. Alternatively the nitrile may be converted directly into the appropriate acid by heating with concentrated mineral acid, for example, hydrochloric acid in the presence, if required, of a lower alkanol to assist solution of the nitrile. Additionally the nitrile may be converted into the amide for example by warming with hydrogen peroxide solution in the presence of alkali. The amide may then be hydrolysed to the acid by boiling with a solution of an alkali hydroxide, for example sodium hydroxide or potassium hydroxide.

Metal salts or salts with pharmaceutically acceptable bases, for example, 1,2,3,6-tetrahydropyridine and amides of the acids (I) may be obtained by standard preparations well known to those skilled in the art.

Following is a description by way of example of methods of carrying the invention into effect.

Example 1.—4-(4-biphenylyl)-3-hydroxybutyric acid (a) 1-(4-biphenylyl)-3-chloropropan-2-ol: 2,3 - epoxypropyl chloride (111 g.) was added slowly to a stirred solution of a Grignard reagent prepared from magnesium (14.6 g.) and p-bromodiphenyl (140 g.) in anhydrous ether (700 ml.) at a rate just sufficient to keep the mixture refluxing gently. After the addition was complete the mixture was allowed to stand overnight and was then decomposed by the careful addition of a slight excess of 2 N hydrochloric acid. The ether layer was separated, washed with water, dried over anhydrous sodium sulphate and the ether evaporated off. The residual oil was heated to 130° C. at 0.1 mm. pressure to remove low boiling by-products (mainly 1-bromo-3-chloropropan-2-ol). The residue solidified on cooling to yield the product which had M.P. 111–113° C. after crystallisation from light petroleum (B.P. 60 to 80° C.).

(b) 4-(4'-biphenylyl)-3-hydroxybutyronitrile: A solution of 1-(4'-biphenylyl)-3-chloropropan-2-ol (32 g.) in ethanol (300 ml.) was treated with a solution of potassium cyanide (10.2 g.) in water (25 ml.) when the mixture was heated under reflux for 90 minutes. It was then cooled, poured into ice water and the solids collected, washed with cold water and dried in air. The product had M.P. 101 to 102° C. after crystallisation from a mixture of benzene and light-petroleum (B.P. 60 to 80° C.).

(c) Methyl 4-(4'-biphenylyl)-3-hydroxybutyrate: A solution of 4-(4'-biphenylyl)-3-hydroxybutyronitrile (20 g.) in methanol (200 ml.) was saturated with hydrogen chloride, allowed to stand overnight then heated under reflux for 8 hours. The methanol was boiled off, the residue was diluted with water and the oil extracted with chloroform. The chloroform layer was washed acid-free with water and the chloroform distilled off to yield the product.

(d) 4-(4'-biphenylyl)-3-hydroxybutyric acid: The foregoing methyl ester (11.5 g.) was heated under reflux for 4 hours with a solution of sodium hydroxide (2.1 g.) in water (100 ml.). The resultant solution was added with stirring whilst still warm to a warm solution of 0.5 N hydrochloric acid (ca. 150 ml.) when the crude acid was precipitated without contamination by its sodium salt. The solids were collected, washed with cold water, dried at 100° C. and crystallised from benzene to yield the product, M.P. 150 to 151° C.

Example 2.—3-hydroxy-4-o-tolylbutyric acid (a) 2-hydroxy-3-o-tolylpropyl chloride: This compound was prepared as described by Beasley et al. (J. Pharm. Pharmacol. 1959, 11, 36–42) by reaction of o-tolyl-magnesium bromide with 2,3-epoxypropyl chloride in ether.

(b) 3-hydroxy-4-o-tolylbutyronitrile, was obtained by reaction of the foregoing chlorohydrin with 1.2 equivalents of potassium cyanide in aqueous ethanol at reflux temperature for 90 minutes as described in Example 1b. At the end of the reaction the mixture was concentrated to about half bulk then poured into ice-water. The resultant oil was extracted with chloroform, the chloroform extract was washed with water and the chloroform was evaporated off, leaving the product which had B.P. 126° C. as 0.3 mm.

(c) ethyl-3-hydroxy-4-o-tolylbutyrate: A solution of the foregoing nitrile (10 g.) in ethanol (100 ml.) containing one mole equivalent of water was saturated with hydrogen chloride and heated under reflux for 5 hours. It was cooled, resaturated with hydrogen chloride and again heated under reflux for 5 hours. The solution was then cooled, poured into water and extracted twice with chloroform. The chloroform extracts were washed with water and the chloroform boiled off to yield the product as an oil, B.P. 102° C. at 0.2 mm.

(d) 3-hydroxy-4-o-tolylbutyric acid: A mixture of the foregoing ester (11.1 g.) with a solution of sodium hydroxide (4 g.) in water (200 ml.) was heated on the steam-bath with intermittent shaking when a homogeneous solution was obtained (after about 30 minutes). Heating was continued for 2 hours when the mixture was cooled slightly and poured with stirring into 0.5 N hydrochloric acid. The product was isolated with chloroform. It had M.P. 87–89° C. after crystallisation from benzene.

Example 3.—3-hydroxy-4-(4'-isobutylphenyl)-butyric acid (a) 2 - hydroxy-3-(4'-isobutylphenyl)-propyl chloride was prepared by reaction of 4-isobutylphenylmagnesium bromide with 2,3-epoxypropyl chloride as described in Example 1a. It had B.P. 112–114° C. at 0.1 mm.

(b) 3 - hydroxy-4-(4'-isobutylphenyl)-butyronitrile: A solution of the foregoing 2-hydroxy-3-(4'-isobutylphenyl) propyl chloride (22.65 g.) in ethanol (300 ml.) was treated with a solution of potassium cyanide (7.15 g.) in water (20 ml.) and the mixture heated under reflux for 75 minutes. The mixture was concentrated to half-bulk then diluted with ice-water to precipitate the product. This was extracted twice with chloroform and the extracts washed with water. The chloroform was distilled off to yield the product, B.P. 142–144° C. at 0.25 mm.

(c) Ethyl - 3 - hydroxy-4-(4'-isobutylphenyl)butyrate was prepared by hydrolysis of the foregoing nitrile with ethanolic hydrogen chloride at reflux temperature as described in Example 2c. It had B.P. 142–146° at 0.2 mm.

(d) 3-hydroxy-4-(4'-isobutylphenyl)butyric acid was obtained by hydrolysis of the foregoing ethyl ester with two mole equivalents of aqueous sodium hydroxide on the steam-bath as described in Example 2d. It had M.P. 85–87° C. after crystallisation from a mixture of benzene and light petroleum (B.P. 60–80° C.).

Example 4.—3-hydroxy-4-(1'-naphthyl)butyric acid (a) 2-hydroxy-3-(1'-naphthyl)propyl chloride was prepared by reaction of 1-naphthylmagnesium bromide with 2,3-epoxy-propyl chloride (2 mole equivalents) in ethereal solution as described in Example 1a. It was alternatively prepared by reaction of α-naphthyl lithium with 2,3-epoxypropyl chloride as described in J. Amer. Chem. Soc., 1952, 74, 1594–1595. It had B.P. 140° C. at 0.2 mm.

(b) 3-hydroxy-4-(1'-naphthyl)butyronitrile was prepared by reaction of the foregoing chloride with potassium cyanide in aqueous ethanolic solution as described in Example 1b. It had M.P. 68–69° C. after crystallisation from a mixture of ether and light petroleum (B.P. 40–60° C.).

(c) Ethyl-3-hydroxy-4-(1'-naphthyl)butyrate was obtained by reaction of the foregoing nitrile with ethanolic hydrogen chloride as described in Example 2c. It had B.P. 150° C. at 0.25 mm.

(d) 3-hydroxy-4-(1'-naphthyl)butyric acid was obtained by hydrolysis of the foregoing ethyl ester with 2 mole equivalents of sodium hydroxide solution on the steam-bath as described in Example 2d. It had M.P. 110–111° C. after crystallisation from benzene.

Example 5.—3-hydroxy-4-phenylbutyric acid (a) 2-hydroxy-3-phenylpropyl chloride, was prepared by reaction of phenylmagnesium bromide with 2 mole equivalents of 2,3-epoxypropyl chloride in ethereal solution as described in Example 1a. It had B.P. 68° C. at 0.05 mm.

(b) 3-hydroxy-4-phenylbutyronitrile, obtained by reaction of the foregoing chloride with potassium cyanide in aqueous ethanol as described in Example 2b, had B.P. 114° C. at 0.3 mm.

(c) Ethyl-3-hydroxy-4-phenylbutyrate was prepared by reaction of the foregoing nitrile with ethanolic hydrogen chloride as described in Example 2c. It had B.P. 92° C. at 0.2 mm.

(d) 3-hydroxy-4-phenylbutyric acid, obtained by alkaline hydrolysis of the foregoing ethyl ester as described in Example 1d, had M.P. 98° C. after crystallisation from benzene.

Example 6.—4-(p-chlorophenyl)-3-hydroxybutyric acid (a) 3-(p-chlorophenyl)-2-hydroxypropyl chloride was prepared by reaction of p-chlorophenylmagnesium bromide with 2,3-epoxypropyl chloride as described in Example 1a. It had B.P. 107° C. at 0.5 mm.

(b) 4-(p - chlorophenyl)-3 - hydroxybutyronitrile, obtained by reaction of the foregoing chloride with potassium cyanide in aqueous ethanol as described in Example 2b. It had B.P. 155° C. at 0.8 mm.

(c) Ethyl-4-(p-chlorophenyl)-3 - hydroxybutyrate was prepared by reaction of the foregoing nitrile with ethanolic hydrogen chloride at reflux temperature as described in Example 2c. It had B.P. 112° C. at 0.2 mm.

(d) 4-(p - chlorophenyl)-3 - hydroxybutyric acid was readily obtained by hydrolysis of the foregoing ethyl ester with 2 mole equivalents of sodium hydroxide solution on the steam-bath as described in Example 2d. It had M.P. 113 to 114° C. after crystallisation from benzene.

Example 7.—4-(2'-biphenylyl)-3-hydroxybutyric acid (a) 3-(2'-biphenylyl)-2-hydroxypropyl chloride was prepared by reaction of diphenyl-(2)-magnesium iodide with 2 mole equivalents of 2,3-epoxypropyl chloride in anhydrous ethereal solution essentially as described in Example 1a. It had B.P. 130 to 135° C. at 0.1 mm.

(b) 4-(2'-biphenylyl)-3-hydroxybutyronitrile was prepared by reaction of the foregoing propyl chloride with potassium cyanide in aqueous ethanol as described in Example 1b. It had B.P. 155° C. at 0.1 mm.

(c) Ethyl-4-(2'-biphenylyl-3-hydroxybutyrate was obtained by reaction of the foregoing nitrile with ethanolic hydrogen chloride at reflux temperature as described in Example 2c. It had B.P. 150° C. at 0.1 mm.

(d) 4-(2'-biphenyl)-3-hydroxybutyric acid was obtained by hydrolysis of the foregoing ethyl ester with 2 equivalents of aqueous sodium hydroxide on the steam-bath as described in Example 2d. It was obtained as an oil.

Example 8.—4-(m-chlorophenyl)-3-hydroxybutyric acid (a) 3-(m-chlorophenyl)-2-hydroxypropyl chloride was prepared by reaction of m-chlorophenylmagnesium bromide with 2 molar equivalents of 2,3-epoxypropyl chloride in anhydrous ethereal solution as described in Example 1a. It had B.P. 112° C. at 0.1 mm.

(b) 4-(m-chlorophenyl)-3-hydroxybutyronitrile was obtained by reaction of the foregoing chloride with potassium cyanide in aqueous ethanol as described in Example 2b. It had B.P. 146 to 148° C. at 0.2 mm.

(c) Ethyl-4-(m-chlorophenyl)-3-hydroxybutyrate was prepared by heating the foregoing nitrile with ethanolic hydrogen chloride at reflux temperature as described in Example 2c. It had B.P. 129 to 131° C. at 0.3 mm.

(d) 4-(m-chlorophenyl)-3-hydroxybutyric acid was obtained by hydrolysis of the foregoing ethyl ester with 2 mole equivalents of sodium hydroxide solution on the steam-bath as described in Example 2d. It had M.P. 86–88° C. after crystallisation from benzene-light petroleum.

Example 9.—White scored tablets each containing 30 mg. of 4-(4'-biphenylyl)-3-hydroxybutyric acid

| | |
|---|---|
| 4-(4'-biphenylyl)3-hydroxybutyric acid ____mg.___ | 30 |
| Lactose _____mg.___ | 133 |
| Starch _____mg.___ | 19.4 |
| Starch paste, 15 percent w./w. _____A sufficient quantity | |
| Magnesium stearate _____mg.___ | 1.9 |
| Starch, sufficient to make _____mg.___ | 194.4 |

The first three ingredients are thoroughly mixed together, dry, and the mixture granulated with a suitable amount of the 15 percent starch paste. The resultant granule is tray-dried at 50° C., processed through a No. 20 mesh sieve and the lubricant (magnesium stearate) added, together with sufficient starch to produce the required weight. After thorough mixing, tablets each weighing 194.4 mg. are compressed from the mixture, using punches of convenient diameter and suitably embossed to provide a break-line on one surface.

Example 10.—3-hydroxy-4-phenylbutyramide

A solution of 3-hydroxy-4-phenylbutyronitrile (21.0 g.), (prepared as described in Example 5b), in ethanol (130 ml.), was treated with a solution of sodium hydroxide (1.2 g.) in water (7 ml.), followed by 30 percent hydrogen peroxide solution (26 ml.), added portionwise with intermittent cooling to keep the reaction temperature below 45° C. The mixture was allowed to stand for 30 minutes when a further volume (26 ml.) of 30 percent hydrogen peroxide solution was added and the mixture was heated at 60 to 70 C. for 1 hour. It was then filtered to remove a trace of insoluble impurity, diluted with water (1 volume) and concentrated at reduced pressure (approximately 30 mm.) to a volume of approximately 50 ml. The residual liquid was just acidified with 2 N. hydrochloric acid and diluted with an equal volume of water. The product crystallised rapidly on standing. It had M.P. 121 to 123° C. after crystallisation from ethyl acetate.

Example 11.—3-hydroxy-4-m-tolylbutyric acid (a) 3-hydroxy-4-m-tolylbutyronitrile was obtained by reaction of 2-hydroxy-3-m-tolylpropyl chloride with 1.2 equivalents of potassium cyanide in aqueous ethanol at reflux temperature as described in Example 2b. It had B.P. 131° C. at 0.4 mm.

(b) Ethyl-3-hydroxy-4-m-tolylbutyrate was prepared by reaction of the foregoing nitrile with ethanolic hydrogen chloride at reflux temperature as described in Example 2c. It had B.P. 102–104° C. at 0.2 mm.

(c) 3-hydroxy-4-m-tolylbutyric acid, was prepared by hydrolysis of the foregoing ester with two equivalents of aqueous sodium hydroxide on the steam-bath as described in Example 2d. It had M.P. 86–88° C. after crystallisation from benzene.

Example 12.—3-hydroxy-4-(m-trifluoromethyl-phenyl)butyric acid (a) 2-hydroxy-3-(m-trifluoromethylphenyl)propyl chloride, was prepared by reaction of m-trifluoromethylphenyl magnesium bromide with 2 mole equivalents of 2,3-epoxypropyl chloride as described in Example 1a. It had B.P. 80° C. at 0.1 mm.

(b) 3 - hydroxy-4-(m - trifluoromethylphenyl)butyronitrile was obtained by reaction of the foregoing chlorohydrin with potassium cyanide in aqueous ethanol as described in Example 2b. It had B.P. 130° C. at 0.2 mm.

(c) Ethyl-3-hydroxy-4-(m-trifluoromethylphenyl)butyrate, prepared by reaction of the foregoing nitrile with ethanolic hydrogen chloride at reflux temperature as described in Example 2c, had B.P. 120 to 125° C. at 1 mm.

(d) 3-hydroxy - 4 - (m - trifluoromethylphenyl)butyric acid, obtained by hydrolysis of the foregoing ester with 2 mole equivalents of sodium hydroxide solution on the steam-bath as described in Example 2d, had M.P. 88 to 90° C. after crystallisation from a mixture of benzene and light-petroleum (B.P. 60 to 80° C.).

Example 13.—4-(p-tert.-butylphenyl)-3-hydroxybutyric acid (a) 3-(p-tert.-butylphenyl)-2-hydroxypropyl chloride was prepared by reaction of p-tert.-butyl phenylmagnesium bromide with 2,3-epoxypropyl chloride as described in Example 1a. It had B.P. 106° C. at 0.1 mm.

(b) 4-(p-tert.-butylphenyl)-3-hydroxybutyronitrile, prepared from the foregoing chlorohydrin by reaction with potassium cyanide in aqueous ethanol, had B.P. 140° C. at 0.2 mm.

(c) Ethyl-4-(p - tert. - butylphenyl)-3-hydroxybutyrate, prepared by reaction of the foregoing nitrile with ethanolic hydrogen chloride at reflux temperature, had B.P. 130 to 132° C. at 0.2 mm.

(d) 4-(p-tert.-butylphenyl)-3-hydroxybutyric acid, obtained by hydrolysis of the foregoing ester with aqueous sodium hydroxide as described in Example 2d, had M.P. 101 to 103° C. after crystallisation from a mixture of benzene and light petroleum (B.P. 60 to 80° C.).

Example 14.—4-(m-biphenylyl)-3-hydroxybutyric acid (a) 3-(m-biphenylyl)-2-hydroxypropyl chloride, prepared by reaction of biphenyl-(3)-magnesium bromide with 2,3-epoxypropyl chloride as described in Example 1a, had B.P. 170° C. at 0.4 mm.

(b) 4 - (m-biphenylyl)-3 - hydroxybutyronitrile prepared by reaction of the foregoing chlorohydrin with potassium cyanide in aqueous ethanol as described in Example 1b, and B.P. 190° C. at 0.2 mm.

(c) Ethyl-4 - (m-biphenylyl) - 3-hydroxybutyrate obtained by reaction of the foregoing nitrile with ethanolic hydrogen chloride at reflux temperature as described in Example 2c, had B.P. 190° C. at 0.2 mm.

(d) 4 - (m-biphenylyl) - 3-hydroxybutyric acid was obtained by hydrolysis of the foregoing ester with 2-equivalents of aqueous sodium hydroxide on the steambath as described in Example 2d. It had M.P. 116 to 118° C. after crystallisation from benzene.

Example 15.—3-hydroxy-4-[phenanthryl(9)]-butyric acid (a) 2-hydroxy - 3-[phenanthryl(9)] - propyl chloride was prepared by reaction of phenanthrene - (9)-magnesium bromide with 2,3-epoxypropyl chloride as described in Example 1a. It had M.P. 114 to 116° C. after crystallisation from a mixture of benzene and light-petroleum (B.P. 60 to 80° C.).

(b) 3-hydroxy-4 - [phenanthryl(9)] - butyronitrile, was obtained by reaction of the foregoing chlorohydrin with potassium cyanide in aqueous ethanol as described in Example 1b. It had M.P. 119 to 121° C. after crystallisation from a mixture of benzene and light-petroleum (B.P. 60 to 80° C.).

(c) Ethyl-3 - hydroxy - 4-[phenanthryl(9)]butyrate was obtained by reaction of the foregoing nitrile with ethanolic hydrogen chloride as described in Example 2c. After isolation with chloroform, the chloroform was distilled off at reduced pressure and the residual crude ester used for the final stage of the reaction.

(d) 3-hydroxy - 4 - [phenanthryl(9)]-butyric acid, obtained by hydrolysis of the foregoing crude ester with aqueous-ethanolic sodium hydroxide solution on the steam-bath, had M.P. 160 to 162° C. after crystallisation from ethanol.

Example 16.—3-hydroxy-4-(p-methoxyphenyl)-butyric acid (a) 2-hydroxy - 3-(p-methoxyphenyl) - propyl chloride, prepared by reaction of p-methoxyphenylmagnesium bromide with 2,3-epoxypropyl chloride as described in Example 1a, had B.P. 108 to 110° C. at 0.1 mm.

(b) 3-hydroxy - 4 - (p-methoxyphenyl)-butyronitrile was obtained by reaction of the foregoing chlorohydrin with potassium cyanide in 95 percent methanol. It was then isolated as described in Example 1b and had M.P. 59 to 60° C. after crystallisation from a mixture of benzene and light petroleum (B.P. 60 to 80° C.).

(c) Ethyl - 3-hydroxy - 4-(p-methoxyphenyl)-butyrate, obtained by reaction of the foregoing nitrile with ethanolic hydrogen chloride a reflux temperature, had B.P. 139° C. at 0.1 mm.

(d) 3-hydroxy - 4-(p-methoxyphenyl) - butyric acid, prepared by hydrolysis of the foregoing ester with aqueous-ethanolic sodium hydroxide solution on the steam-bath, had M.P. 92 to 94° C. after crystallisation from benzene.

Example 17.—3-hydroxy-4-(o-methoxyphenyl)-butyric acid (a) 2-hydroxy - 3-(o-methoxyphenyl)propyl chloride, obtained by reaction of o-methoxyphenyl magnesium bromide with 2,3-epoxypropyl chloride as described in Example 1a had B.P. 122° C. at 0.9 mm.

(b) 3-hydroxy-4 - (o-methoxyphenyl) - butyronitrile, obtained from the foregoing chlorohydrin by reaction with potassium cyanide in ethanolic solution as described in Example 1b, had B.P. 158° C. at 1.0 mm.

(c) Ethyl-3-hydroxy - 4 - (o-methoxyphenyl)butyrate, obtained by reaction of the foregoing nitrile with ethanolic hydrogen chloride at reflux temperature had B.P. 152° C. at 1.2 mm.

(d) 3 - hydroxy - 4-(o-methoxyphenyl)butyric acid, prepared by hydrolysis of the foregoing ester with aqueous-ethanolic sodium hydroxide solution, had M.P. 98 to 99° C. after crystallisation from a mixture of benzene and light-petroleum (B.P. 60 to 80° C.).

Example 18.—4-(o-ethoxyphenyl)-3-hydroxybutyric acid (a) 3-o-ethoxyphenyl) - 2 - hydroxypropyl chloride, prepared as described in the Journal of Pharmacy and Pharmacology (1959, 11, 36), had B.P. 122 to 123° C. at 1 mm.

(b) 4 - (o - ethoxyphenyl) - 3-hydroxybutyronitrile was obtained by reaction of the foregoing chlorohydrin with potassium cyanide in aqueous-ethanol. It had B.P. 156 to 158° C. at 1.3 mm.

(c) Ethyl - 4 - (o-ethoxyphenyl) - 3 - hydroxybutyrate prepared by reaction of the foregoing nitrile with ethanolic hydrogen chloride at reflux temperature as described in Example 2c, had B.P. 148° C. at 0.9 mm.

(d) 4 - (o-ethoxyphenyl) - 3-hydroxybutyric acid was prepared by hydrolysis of the foregoing ester with aqueous ethanolic sodium hydroxide solution on the steam-bath. It had B.P. 168 to 172° C. at 0.1 mm. and M.P. 62 to 64° C. after crystallisation from a mixture of benzene and light-petroleum (B.P. 60 to 80° C.).

Example 19.—4-(o-ethoxyphenyl)-3-hydroxybutyramide

A solution of 4-(o-ethoxyphenyl)-3-hydroxybutyronitrile [9.24 g., prepared as described in Example 18b], in ethanol (24 ml.) was treated with 30 percent hydrogen peroxide solution (17.85 ml.) and 6 N sodium hydroxide solution (1.8 ml.). Slight cooling was applied initially to keep the temperature of the reaction mixture below 50° C. then the mixture was kept at 45 to 50° C. for 3 hours. It was then neutralised by the addition of 2 N sulphuric acid and evaporated to dryness at reduced pressure (10 to 15 mm.). Extraction of the residue with boiling ethyl acetate followed by evaporation of the solvent, yielded the product which had M.P. 86 to 88° C. after crystallisation from benzene.

Example 20.—4-(p-ethoxyphenyl)-3-hydroxybutyric acid (a) 3-(p-ethoxyphenyl)-2-hydroxypropyl chloride was prepared by reaction of p-ethoxyphenyl magnesium bromide with 2,3-epoxypropyl chloride as described in Example 1a. It had B.P. 112 to 114° C. at 0.1 mm.

(b) 4 - (p-ethoxyphenyl) - 3-hydroxybutyronitrile, was obtained by reaction of the foregoing chlorohydrin with potassium cyanide in aqueous ethanol. It had B.P. 138 to 140° C. at 0.05 mm.

(c) Ethyl-4-(p - ethoxyphenyl)-3-hydroxybutyrate was prepared by reaction of the foregoing nitrile with ethanolic hydrogen chloride at reflux temperature as described in Example 2c. It had B.P. 136° C. at 0.1 mm.

(d) 4-(p-ethoxyphenyl)-3-hydroxybutyric acid was obtained by hydrolysis of the foregoing ester with a solution of sodium hydroxide in 50 percent aqueous ethanol on the steam-bath. It had M.P. 94 to 96° C. after crystallisation from benzene.

Example 21.—4-(p-butoxyphenyl)-3-hydroxybutyric acid (a) 3-(p-butoxyphenyl)-2-hydroxypropyl chloride, was prepared by reaction of p-butoxyphenyl magnesium bromide with 2,3-epoxypropyl chloride as described in Example 1a. It had B.P. 116° C. at 0.05 mm.

(b) 4-(p - butoxyphenyl)-3-hydroxybutyronitrile, was obtained when a solution of the foregoing chlorohydrin in ethanol was heated with an aqueous solution of potassium cyanide. It had B.P. 156° C. at 0.03 mm.

(c) Ethyl-4-(p-butoxyphenyl)-3-hydroxybutyrate, was prepared by heating the foregoing nitrile with ethanolic hydrogen chloride as described in Example 2c. It had B.P. 146° C. at 0.03 mm.

(d) 4-(p-butoxyphenyl) - 3 - hydroxybutyric acid, obtained from the foregoing ester by hydrolysis with sodium hydroxide in 50 percent aqueous ethanol, had M.P. 80 to 82° C. after crystallisation from a mixture of benzene and light-petroleum (B.P. 60 to 80° C.).

Example 22.—4-(p-butoxyphenyl)-3-hydroxybutyramide

A solution of 4-(p-butoxyphenyl)-3-hydroxybutyronitrile [12.0 g., prepared as described in Example 21b] in ethanol (25 ml.) was treated with 6 N sodium hydroxide solution (2 ml.) and then with 30 percent hydrogen peroxide solution (20.5 ml.). Slight cooling was applied initially to keep the reaction temperature below 50° C. then the mixture was kept at 50 to 55° C. for 3 hours. The product separated on cooling. It had M.P. 130° C. after crystallisation from water.

Example 23.—Ethyl-4-(p-cyclohexylphenyl)-3-hydroxybutyrate (a) 3-(p - cyclohexylphenyl)-2-hydroxypropyl chloride was obtained by reaction of (p-cyclohexyl)phenylmagnesium bromide with 2,3-epoxypropyl chloride as described in Example 1a. It had B.P. 130 to 132° C. at 0.1 mm.

(b) 4-(p-cyclohexylphenyl)-3-hydroxybutyronitrile was obtained by reaction of the foregoing chlorohydrin with potassium cyanide in aqueous ethanol at reflux temperature. It had B.P. 155° C. at 0.1 mm.

(c) Ethyl-4-(p - cyclohexylphenyl)-3-hydroxybutyrate was prepared by heating the foregoing nitrile with ethanolic hydrogen chloride at reflux temperature as described in Example 2c. It had B.P. 150° C. at 0.1 mm. and refractive index $n_D^{20} = 1.5222$.

Example 24.—4-(p-biphenylyl)-3-hydroxybutyric acid (a) 4-(p-biphenylyl)-3-hydroxybutyramide: A solution of 4-(p-biphenylyl)-3-hydroxybutyronitrile, [118.5 g., prepared as described in Example 1b], in ethanol (900 ml.) was stirred and treated with a solution of sodium hydroxide (5 g.) in water (10 ml.), followed by 30 percent hydrogen peroxide solution (100 ml.) added dropwise. The temperature of the mixture rose to 55° C. and solids began to separate. Stirring was continued for 30 minutes when additional 30 percent hydrogen peroxide (100 ml.) was again added slowly. The mixture was maintained at 50 to 55° C. for 90 minutes and was then cooled, diluted with water (2 litres) and just acidified with dilute sulphuric acid. The product was collected and washed with water. It had M.P. 178 to 181° C., raised by crystallisation from 95 percent ethanol to 182 to 184° C.

(b) 4-(p-biphenylyl)-3-hydroxybutyric acid: A suspension of the foregoing amide (25.5 g.) in water (200 ml.) containing 85 percent potassium hydroxide (14 g.) was heated under reflux for 8 hours when evolution of ammonia was complete. It was then cooled slightly and filtered to remove traces of an insoluble impurity. The filtrate was diluted to 400 ml., stirred vigorously, heated to 90° C. and acidified by the addition of a hot solution of concentrated hydrochloric acid (30 ml.) in water (200 ml.). The product was collected and washed with water. It had M.P. 150 to 151° C. after crystallisation from 1,2-dichloroethane and is identical with the product described in Example 1.

EXAMPLE 25.—3-hydroxy-4(p-phenoxyphenyl)butyric acid (a) 2-hydroxy-3-(p-phenoxyphenyl)propyl chloride was prepared by reaction of diphenylether-(4)-magnesium bromide with 2,3-epoxypropyl chloride as described in Example 1a. It had B.P. 144° C. at 0.1 mm.

(b) 3 - hydroxy-4-(p-phenoxyphenyl)butyronitrile, obtained by reaction of the foregoing chlorohydrin with a solution of potassium cyanide in aqueous ethanol at reflux temperature, had B.P. 160° C. at 0.1 mm.

(c) Ethyl - 3 - hydroxy-4-(p-phenoxyphenyl))butyrate was prepared by heating the foregoing nitrile with ethanolic hydrogen chloride at reflux temperature. It had B.P. 171 to 174° C. at 0.1 mm.

(d) 3-hydroxy-4-(p-phenoxyphenyl)butyric acid, prepared by hydrolysis of the foregoing ester with a solution of sodium hydroxide in aqueous ethanol on the steam-bath, had M.P. 83 to 85° C. after crystallisation from a mixture of benzene and light-petroleum (B.P. 60 to 80° C.).

EXAMPLE 26.—4-(4-butoxy-m-biphenylyl)-3-hydroxybutyric acid (a) 3-bromo-4-butoxybiphenyl: A solution of 3-bromo-4-hydroxybiphenyl (107.4 g.) in ethanol (500 ml.) containing 85 percent potassium hydroxide (27.3 g.) was treated with butyl bromide (69 g.) and the mixture heated at reflux temperature for 5 hours. It was then cooled and diluted with water (1 litre). The product, isolated with chloroform had B.P. 145 to 148° C. at 0.1 mm. and M.P. 45 to 47° C. after crystallisation from methanol.

(b) 3-(4-butoxy-m-biphenylyl)-2-hydroxypropyl chloride was obtained by reaction of 4-butoxybiphenyl-(3)-magnesium bromide with 2,3-epoxypropyl chloride as described in Example 1a. It had M.P. 78 to 79° C. after crystallisation from light petroleum (B.P. 60 to 80° C.).

(c) 4 - (4-butoxy-m-biphenylyl)3-hydroxybutyronitrile, obtained by reaction of the foregoing chlorohydrin with potassium cyanide in aqueous ethanol at reflux temperature had B.P. 176 to 180° C. at 0.1 mm.

(d) Ethyl-4-(4-butoxy-m-biphenylyl) - 3 - hydroxybutyrate, prepared by heating the foregoing nitrile with ethanolic hydrogen chloride at reflux temperature, had B.P. 182 to 186° C. at 0.1 mm.

(e) 4-(4-butoxy-m-biphenylyl)-3-hydroxybutyric acid, was prepared by hydrolysis of the foregoing ester with a solution of sodium hydroxide in aqueous ethanol on the steam-bath. It had M.P. 124 to 125° C. after crystallisation from a mixture of benzene and light petroleum (B.P. 60 to 80° C.).

EXAMPLE 27.—4-(p-cyclopent-1-enyl)-phenyl-3-hydroxybutyric acid (a) 4 - bromophenylcyclopent-1-ene: p-bromobenzenemagnesium bromide, prepared from p-dibromobenzene (141 g.) and magnesium (14.4 g.) in ether (850 ml.), was stirred and treated during 1 hour with a solution of cyclopentanone (50.5 g.) in ether (350 ml.). Stirring was continued for 3 hours when the mixture was decomposed by the addition of a solution of ammonium chloride (140 g.) in water (500 ml.). The ether layer was washed with water, dried with anhydrous sodium sulphate and the residual oil distilled to yield the crude carbinol, B.P. 120 to 140° C. at 0.1 mm. This (73 g.) was dissolved in a mixture of glacial acetic acid (400 ml.) and acetic anhydride (35 ml.) and the mixture heated under reflux for 3 hours. The solvent was distilled off at a pressure of 20 mm. and the residual product extracted with chloroform. The extract was washed with water and the chloroform distilled off to yield the product which had M.P. 91 to 93° C. after crystallisation from ethanol.

(b) 3 - (p - cyclopent-1-enyl)phenyl-2-hydroxypropyl chloride was prepared by reaction of 4-(p-cyclopent-1-enyl)-phenylmagnesium bromide with 2,3-epoxypropyl chloride. It had M.P. 100 to 101° C. after crystallisation from ligroin.

(c) 4 - (p-cyclopent - 1-enyl)phenyl-3-hydroxybutyronitrile, was obtained by reaction of the foregoing chlorohydrin with a solution of potassium cyanide in aqueous ethanol at reflux temperature. It had M.P. 77 to 78° C. after crystalisation from a mixture of benzene and light petroleum (B.P. 60 to 80° C.).

(d) Ethyl-4-(6-cycopent-1-enyl)phenyl - 3 - hydroxybutyrate, prepared by reaction on the foregoing nitrile with ethanolic hydrogen chloride at reflux temperature, had B.P. 165 to 169° C. at 0.15 mm.

(e) 4 - (p - cyclopent-1-enyl)-phenyl-3-hydroxybutyric acid, obtained by hydrolysis of the foregoing ester with a solution of sodium hydroxide in 50 percent aqueous ethanol, had M.P. 153 to 156° C. after crystallisation from aqueous methanol.

Example 28.—Ethyl-4-(p-cyclopentyl)phenyl-3-hydroxybutyrate (a) 3-(p-cyclopentyl)phenyl-2-hydroxypropyl chloride was obtained by reaction of (p-cyclopentyl)phenyl magnesium bromide with 2,3-epoxypropyl chloride. It had B.P. 120 to 122° C. at 0.05 mm.

(b) 4 - (p-cyclopentyl)phenyl - 3 - hydroxybutyronitrile, obtained by reaction of the foregoing chlorohydrin with a solution of potassium cyanide in aqueous ethanol at reflux temperature, had B.P. 150° C. at 0.1 mm.

(c) Ethyl - 4 - (p-cyclopentyl)phenyl - 3 - hydroxybutyrate, prepared by reaction of the foregoing nitrile with ethanolic hydrogen chloride, as described in Example 2c, had B.P. 145 to 147° C. at 0.1 mm.

Example 29.—4-(2'-chloro-p-biphenylyl)-3-hydroxybutyric acid (a) 3 - (2' - chloro-p-biphenylyl) - 2 - hydroxypropyl chloride was obtained by reaction of 2'-chlorobiphenyl-(4)-magnesium bromide with 2,3-epoxypropyl chloride. It had B.P. 150° C. at 0.02 mm.

(b) 4 - (2' - chloro-p-biphenylyl) - 3 - hydroxybutyronitrile was obtained by reaction of the foregoing chlorohydrin with potassium cyanide in aqueous ethanol. It had B.P. 190° C. at 0.05 mm.

(c) Ethyl - 4 - (2' - chloro-p-biphenylyl) - 3 - hydroxybutyrate was obtained by reaction of the foregoing nitrile with ethanolic hydrogen chloride at reflux temperature as described in Example 2c.

(d) 4 - (2' - chloro-p-biphenylyl) - 3 - hydroxybutyric acid: The foregoing ester was hydrolysed by warming with a solution of sodium hydroxide in 50 percent ethanol. It had M.P. 100 to 102° C. after crystallisation from a mixture of benzene and light petroleum (B.P. 60 to 80° C.).

Example 30.—4-(4'-chloro-p-biphenylyl)-3-hydroxybutyric acid (a) 3 - (4' - chloro-p-biphenylyl) - 2 - hydroxypropyl chloride, prepared by reaction of 4'-chlorobiphenyl-(4)-magnesium bromide with 2,3-epoxypropyl chloride as described in Example 1a had M.P. 64 to 66° C. after crystallisation from a mixture of benzene and light petroleum (B.P. 40 to 60° C.).

(b) 4 - (4' - chloro-p-biphenylyl) - 3 - hydroxybutyronitrile was obtained by reaction of the foregoing chlorohydrin with potassium cyanide in aqueous ethanolic solution at reflux temperature. It had M.P. 90 to 92° C. after crystallisation from a mixture of benzene and light petroleum (B.P. 60 to 80° C.).

(c) Ethyl - 4 - (4' - chloro-p-biphenylyl) - 3 - hydroxybutyrate, prepared by reaction of the foregoing nitrile with a solution of hydrogen chloride in ethanol as described in Example 2c, had M.P. 72 to 74° C. after crystallisation from a mixture of ethyl acetate and light petroleum (B.P. 60 to 80° C.).

(d) 4 - (4' - chloro - p - biphenylyl)-3-hydroxybutyric acid was obtained by hydrolysis of the foregoing ester with a solution of sodium hydroxide in aqueous ethanol on the steam-bath. It had M.P. 157 to 159° C. after crystallisation from toluene.

Example 31.—3 - hydroxy - 4 - (3 - methyl-p-biphenylyl)-butyric acid (a) 2-hydroxy-3-(3-methyl-p-biphenylyl)propyl chloride, prepared by reaction of 3-methylbiphenyl-(4)-magnesium bromide with 2,3-epoxypropyl chloride as described in Example 1a, had B.P. 164° C. at 0.05 mm.

(b) 3 - hydroxy - 4 - (3 - methyl-p-biphenylyl)butyronitrile, obtained by reaction of the foregoing chlorohydrin with potassium cyanide in aqueous ethanol as described in Example 1b, had B.P. 176° C. at 0.03 mm.

(c) Ethyl - 3 - hydroxy - 4 - (3 - methyl-p-biphenylyl)-butyrate, prepared by reaction of the foregoing nitrile with ethanolic hydrogen chloride as described in Example 2(c), had B.P. 194° C. at 0.02 mm.

(d) 3 - hydroxy - 4 - (3 - methyl-p-biphenylyl)butyric acid, obtained by hydrolysis of the foregoing ester with a solution of sodium hydroxide in aqueous ethanol on the steam-bath, had M.P. 154 to 156° C. after crystallisation from toluene.

Example 32.—3-hydroxy-4-(β-naphthyl)butyric acid (a) 2-hydroxy-3-(β-naphthyl)propyl chloride, was obtained by reaction of β-naphthylmagnesium bromide with 2,3-epoxypropyl chloride. It had B.P. 140° C. at 0.05 mm.

(b) 3 - hydroxy - 4 - (β-napthyl)butyronitrile, prepared by reaction of the foregoing chlorohydrin with potassium cyanide in aqueous ethanol, had B.P. 174° C. at 0.05 mm.

(c) Ethyl - 3 - hydroxy - 4 - (β-naphthyl)butyrate, was obtained when the foregoing nitrile was heated with ethanolic hydrogen chloride as described in Example 2c. It had B.P. 158° C. at 0.25 mm.

(d) 3 - hydroxy - 4 - (β-naphthyl)butyric acid, prepared by hydrolysis of the foregoing ester with aqueous sodium hydroxide solution on the steam bath, had M.P. 126 to 128° C. after crystallisation from benzene.

Example 33.—3 - hydroxy - 4 - (4 - methoxy-m-biphenylyl)butyric acid (a) 2 - hydroxy - 3 - (4 - methoxy-m-biphenylyl)-propyl chloride, prepared by reaction of 4 - methoxybiphenyl - 3 - magnesium bromide with 2,3-epoxypropyl chloride as described in Example 1a, had B.P. 165° C. at 0.05 mm. and solidified slowly on standing.

(b) 3 - hydroxy - 4 - (4 - methoxy-m-biphenylyl)-butyronitrile was obtained by reaction of the foregoing chlorohydrin with potassium cyanide as described in Example 1b. It had M.P. 73 to 75° C. after crystallisation from a mixture of ether and light petroleum (B.P. 40 to 60° C.).

(c) Ethyl-3-hydroxy-4-(4-methoxy - m - biphenylyl)-butyrate was prepared by reaction of the foregoing nitrile with ethanolic hydrogen chloride as described in Example 2c. It had B.P. 178° C. at 0.15 mm.

(d) 3 - hydroxy - 4 - (4 - methoxy - m - biphenyl)-butyric acid was obtained by hydrolysis of the foregoing ester with hot aqueous sodium hydroxide solution. It had M.P. 121 to 123° C. after crystallisation from benzene.

Example 34.—3-hydroxy-4-(4'-methoxy-p-biphenylyl)-butyric acid (a) 2 - hydroxy - 3 - (4' - methoxy - p - biphenylyl)-propyl chloride was obtained by reaction of 4'-methoxy-biphenyl-(4)-magnesium bromide with 2,3-epoxypropyl chloride as described in Example 1a. It had M.P. 86 to 88° C. after crystallisation from a mixture of ethyl acetate and light petroleum (B.P. 60 to 80° C.).

(b) 3 - hydroxy - 4 - (4' - methoxy - p - biphenylyl)-butyronitrile was prepared by heating the foregoing chlorohydrin with aqueous-ethanolic potassium cyanide. It had M.P. 134 to 136° C. after crystallisation from aqueous ethanol.

(c) Ethyl - 3 - hydroxy - 4 - (4' - methoxy - p - biphenylyl)butyrate was obtained by heating the foregoing nitrile with ethanolic hydrogen chloride, as described in Example 2c.

(d) 3 - hydroxy - 4 - (4' - methoxy - p - biphenylyl)-butyric acid, prepared by hydrolysis of the foregoing ester with hot aqueous sodium hydroxide solution, had M.P. 176 to 178° C. after recrystallisation from benzene.

Example 35.—4-(p-cyclohex-1-enyl)-phenyl-3-hydroxybutyric acid (a) 3 - (p - cyclohex - 1 - enyl)phenyl - 2 - hydroxypropyl chloride was prepared by reaction of p-(cyclohex-1-enyl)-phenylmagnesium bromide with 2,3-epoxypropyl chloride as described in Example 1a. It had M.P. 103 to 104° C. after crystallisation from ligroin.

(b) 4 - (p - cyclohex - 1 - enyl)phenyl - 3 - hydroxybutyronitrile prepared by reaction of the foregoing chlorohydrin with potassium cyanide in aqueous ethanol as described in Example 1b had M.P. 104 to 105° C. after crystallisation from a mixture of benzene and light petroleum (B.P. 60 to 80° C.).

(c) Ethyl - 4 - (p - cyclohex - 1 - enyl)phenyl - 3 - hydroxybutyrate prepared by reaction of the foregoing nitrile with ethanolic hydrogen chloride at reflux temperature had B.P. 170° C. at 0.1 mm.

(d) 4 - (p - cyclohex - 1 - enyl)phenyl - 3 - hydroxybutyric acid prepared by hydrolysis of the foregoing ester with a solution of sodium hydroxide in aqueous ethanol, had M.P. 148 to 150° C. after crystallisation from toluene.

Example 36.—4-(p-cyclohept-1-enyl)phenyl-3-hydroxybutyric acid (a) p - bromophenylcyclohept - 1 - ene had M.P. 51 to 53° C. after crystallisation from methanol. It was prepared by reaction of p-bromophenylmagnesium bromide with cycloheptanone, followed by dehydration of the resultant carbinol with acetic anhydride in acetic acid as described in Example 27a.

(b) 3 - (p - cyclohept - 1 - enyl)phenyl - 2 - hydroxypropyl chloride: The foregoing bromo-compound was converted into its Grignard derivative which was reacted with 2,3-epoxypropyl chloride as described in Example 1a. The product had B.P. 150° C. at 0.1 mm.

(c) 4 - (p - cyclohept - 1 - enyl)phenyl - 3 - hydroxybutyronitrile was obtained when the foregoing chlorohydrin was heated with a solution of aqueous-ethanolic potassium cyanide. It had B.P. 180 to 184° C. at 0.1 mm.

(d) Ethyl - 4 - (p - cyclohept - 1 - enyl)phenyl - 3 - hydroxybutyrate: The foregoing nitrile was heated with ethanolic hydrogen chloride as described in Example 2c to yield the ester, B.P. 171 to 174° C. at 0.1 mm.

(e) 4 - (p - cyclohept - 1 - enyl)phenyl - 3 - hydroxybutyric acid was obtained by hydrolysis of the foregoing ester with aqueous-ethanolic sodium hydroxide solution. It had M.P. 100 to 101° C. after crystallisation from a mixture of benzene and light petroleum (B.P. 60 to 80° C.).

Example 37.—Sodium salt of 4-(p-biphenylyl)-3-hydroxybutyric acid

4 - (p - biphenylyl) - 3 - hydroxybutyric acid (5.12 g.) was added with stirring to a solution of anhydrous sodium carbonate (1.1 g.) in water (100 ml.) at 70° C. The solution was heated to boiling point, filtered and allowed to cool. The product was collected and washed with a little ice-water. It was purified by crystallisation from water and had a decomposition point >300° C.

We claim:
1. A compound selected from the group consisting of:

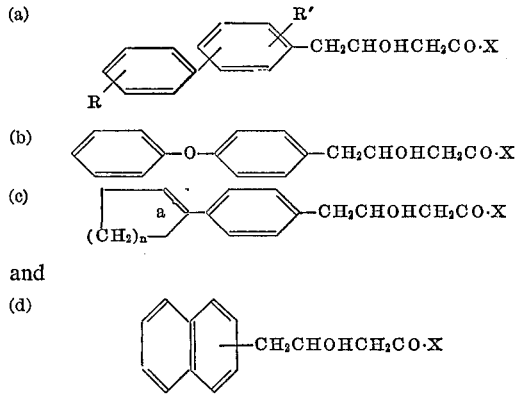

wherein R is selected from the group consisting of hydrogen, chloro, lower alkyl and lower alkoxy, R' is selected from the group consisting of hydrogen and lower alkyl, $n$ is an integer of 1 to 3, $a$ is selected from the group consisting of single and double bonds, and X is selected from the group consisting of hydroxy, lower alkoxy and amino; and the pharmaceutically acceptable salts of the acids where X is hydroxy.

2. 4-(4-butoxy-m-biphenylyl)-3-hydroxybutyric acid.
3. 4-(p-cyclohex-1-enyl)phenyl-3-hydroxybutyric acid.
4. 4 - (p-cyclohept-1 - enyl)phenyl - 3 - hydroxybutyric acid.
5. 4-(p-biphenylyl)-3-hydroxybutyric acid.
6. 4-(p-biphenylyl)-3-hydroxybutyramide.
7. 3-hydroxy-4-(p-phenoxyphenyl)butyric acid.
8. 4 - (p-cyclopent-1 - enyl)phenyl - 3 - hydroxybutyric acid.
9. 4-(2'-chloro-p-biphenylyl)-3-hydroxybutyric acid.
10. 4-(4'-chloro-p-biphenylyl)-3-hydroxybutyric acid.
11. 3-hydroxy-4-(3-methyl-p-biphenylyl)-butyric acid.
12. 3-hydroxy-4-(β-naphthyl)butyric acid.
13. 3-hydroxy-4-(4'-methoxy-p-biphenylyl)-butyric acid.
14. Sodium salt of 4-(p-biphenylyl)-3-hydroxybutyric acid.

References Cited

Beilstein, Organ. Chem., vol. X (Haupt.), p. 268, 1927.
Beilstein, Organ. Chem., vol. X (Erstes), pp. 118–119, 1932.
Morrison & Boyd, "Organic Chemistry," Allyn & Bacon, Boston, 1959, pp. 392, 423–4, 443, 441, 445, 484, 482.
Migrdichian, "Organic Synthesis," vol. I, Reinhold, N.Y., 1957, p. 370.

LORRAINE E. WEINBERGER, Primary Examiner

D. STENZEL, Assistant Examiner

U.S. Cl. X.R.

260—465, 473, 521, 559, 618; 424—308, 317, 324